US005223068A

United States Patent [19]

Baley

[11] Patent Number: 5,223,068

[45] Date of Patent: Jun. 29, 1993

[54] RECONDITIONED AND RESEALED TONER CARTRIDGE, THE METHOD OF MAKING THE SAME, AND A TABLE SAW USED IN THIS METHOD

[76] Inventor: Raymond Baley, 27W211 Waterford Dr., Winfield, Ill. 60190

[21] Appl. No.: 825,850

[22] Filed: Jan. 27, 1992

[51] Int. Cl.[5] .............................................. B32B 7/00

[52] U.S. Cl. .................................... 156/250; 156/94; 156/249; 156/344; 141/364; 355/132; 355/245; 355/246

[58] Field of Search ...................... 355/245, 246, 132; 141/364; 222/DIG.1; 156/250, 94, 249, 344

[56] References Cited

U.S. PATENT DOCUMENTS

| | | | |
|---|---|---|---|
| 4,062,385 | 12/1977 | Katusha et al. | 141/364 |
| 4,538,651 | 9/1985 | Lykins | 141/364 |
| 4,778,086 | 10/1988 | Shibata et al. | 141/364 |
| 4,816,877 | 3/1989 | Keen | 355/260 |
| 4,862,210 | 8/1989 | Woolley | 355/245 |
| 4,924,920 | 5/1990 | Bhagwat | 141/364 |
| 4,961,450 | 10/1990 | Furuta | 141/364 |
| 5,030,998 | 7/1991 | Shibata et al. | 355/245 |
| 5,053,816 | 10/1991 | Takahashi | 355/245 |
| 5,065,195 | 11/1991 | Haneda et al. | 355/212 |
| 5,075,728 | 12/1991 | Kobayashi et al. | 355/245 |
| 5,101,871 | 4/1992 | Susumu | 141/364 |
| 5,110,646 | 5/1992 | Prested et al. | 355/245 |
| 5,134,960 | 8/1992 | Shirai | 355/245 |
| 5,150,807 | 9/1992 | Seyfried et al. | 141/364 |

*Primary Examiner*—David A. Simmons
*Assistant Examiner*—Merrick Dixon
*Attorney, Agent, or Firm*—Wallenstein, Wagner, & Hattis

[57] ABSTRACT

The present inventions are a reconditioned and resealed toner cartridge, the method of making the same, and a table saw used in this method. The reconditioned and resealed toner cartridge has a toner hopper, a new seal assembly and a mounting member. The new seal assembly comprises a gasket and a removable seal member which are secured between the toner hopper and the mounting member and seal the toner discharge opening. The method generally comprises the following steps: a) providing a used toner cartridge having a hopper and a mounting member which are attached by a used gasket, b) separating the toner hopper and mounting member from the used gasket, and c) securing a new seal assembly between said toner hopper and mounting member to seal the toner discharge opening. The table saw has a blade for cutting the outer edge of the used gasket, which separates the gasket from the toner hopper and mounting member. A cart is provided for aligning and carrying the toner cartridge passed the blade. A strip and a guide bar are also provided for ensuring one-directional movement of the cart. Finally, a vacuum system is provided for removing waist debris.

20 Claims, 7 Drawing Sheets

RECONDITIONED AND RESEALED TONER CARTRIDGE, THE METHOD OF MAKING THE SAME, AND A TABLE SAW USED IN THIS METHOD

DESCRIPTION

Technical Field

The present inventions are a reconditioned and resealed toner cartridge for a printing or copying machine, the method of making the same, and a table saw for cutting away the outer edge of a gasket in a toner cartridge subassembly.

Background Prior Art

Many image forming apparatus utilize the xerographic printing process, examples being laser printers, copy machines, micrographic printers and facsimile machines. These image forming apparatus use toner to print or copy the desired image or words onto a piece of paper. The toner is contained in a hopper which must be refilled periodically. For example, the toner in a laser printer must be refilled after printing approximately 3000 pages.

The process of refilling the toner hopper has proven to be difficult and messy. Toner, the "ink" of the print or copy machine, is a powdery substance that must be applied evenly across the surface of a drum during use. However, toner that leaks out of the hopper during shipping can accumulate on the drum and cause blotching, streaking or voiding of prints and copies. Toner leakage can also cause moving parts to wear out more rapidly and can even short out the electrical components in the cartridge. In these ways, toner leakage reduces the quality of prints and copies, increases maintenance costs, and can even decrease the useful life of the image forming machine.

To resolve the problems associated with toner leakage, Canon and Hewlett Packard developed a disposable toner cartridge. This cartridge typically includes a toner hopper, a seal assembly, a mounting member, a magnetic roller assembly, a drum assembly and a corona assembly. By combining these components into a single cartridge, toner is applied evenly across the surface of the drum without leaking out of the hopper during shipping. Unfortunately, this cartridge design is relatively expensive. In addition, the magnetic roller, drum and corona assemblies last considerably longer than 3000 pages. Thus, the disposal of the entire cartridge results in unnecessary waste of material and landfill space—the costs being passed on to the consumers.

Toner leakage is prevented by the seal assembly which is typically provided with a removable seal member. Once this seal member is removed, toner is allowed to flow out of the toner hopper discharge opening and across the surface of the drum. Removal of the seal member also allows toner to permeate throughout the entire cartridge if shaken or flipped upside down. Consequently, the seal member is usually not removed until after the cartridge has been inserted into an image forming machine. Replacement of the removable seal member is essential if the cartridge is to be refilled and reused.

The problem of replacing the removable seal member is that the toner hopper discharge opening is obstructed by the mounting member. In fact, the mounting member is typically welded directly to the periphery of the toner discharge opening. Breaking the welds and inserting a replacement seal is an extremely difficult and labor intensive process. The hopper and mounting member are typically plastic, and not easily separated given the strength of the welds. Great care must be taken not to damage the hopper and mounting members. This additional labor can increase the cost of a resealed cartridge above that of an original cartridge.

To avoid the cost of separating the mounting member from the hopper, some companies have developed a method of force fitting a replacement seal into a used cartridge. The replacement seal is force fit into a slot between the toner hopper and the mounting member so as to cover the toner discharge opening. A few of the companies using this method are Future Graphics, New England Seal and Avolanche Technologies. The problem with the force fit method is that the replacement seals are unreliable and often allow toner to leak out of the hopper during shipping.

The present invention is provided to solve these and other problems.

SUMMARY OF THE INVENTION

The present inventions are a reconditioned and resealed toner cartridge, the method of making the same, and a table saw used in this method. The reconditioned and resealed toner cartridge has a toner hopper, a new seal assembly and a mounting member. The new seal assembly comprises a new gasket and a new removable seal member which are secured between the toner hopper and the mounting member to seal the toner discharge opening.

The method generally comprises the following steps: a) providing a used toner cartridge having a hopper and a mounting member which are attached by a used gasket, b) separating the toner hopper and mounting member from the used gasket, and c) securing a new seal assembly between said toner hopper and mounting member to seal the toner discharge opening.

The table saw has a blade for cutting the outer edge of the used gasket. This breaks the welds and separates the gasket from the toner hopper and mounting member. A cart is provided for aligning and carrying the toner cartridge passed the blade. A strip and a guide bar are also provided for ensuring one-directional movement of the cart. Finally, a vacuum system is provided for removing waist debris.

The main advantage of the present reconditioned and resealed cartridge is its reliable, leak-free seal formed over the toner hopper discharge opening. This seal prevents toner from leaking out of the hopper and accumulating on the drum or its moving parts during shipping and handling. By providing a more reliable seal, the present invention advances the use of refilled toner cartridges and the production of clear quality prints and copies. The present invention also minimizes wear of parts and shorting out of electrical components, thereby reducing maintenance costs, increasing the useful life of the cartridge and image forming machine, and eliminating unnecessary waste of materials.

Other features and advantages of the invention will be apparent from the following specification taken in conjunction with the following drawing.

DETAILED DESCRIPTION

Figure 1:
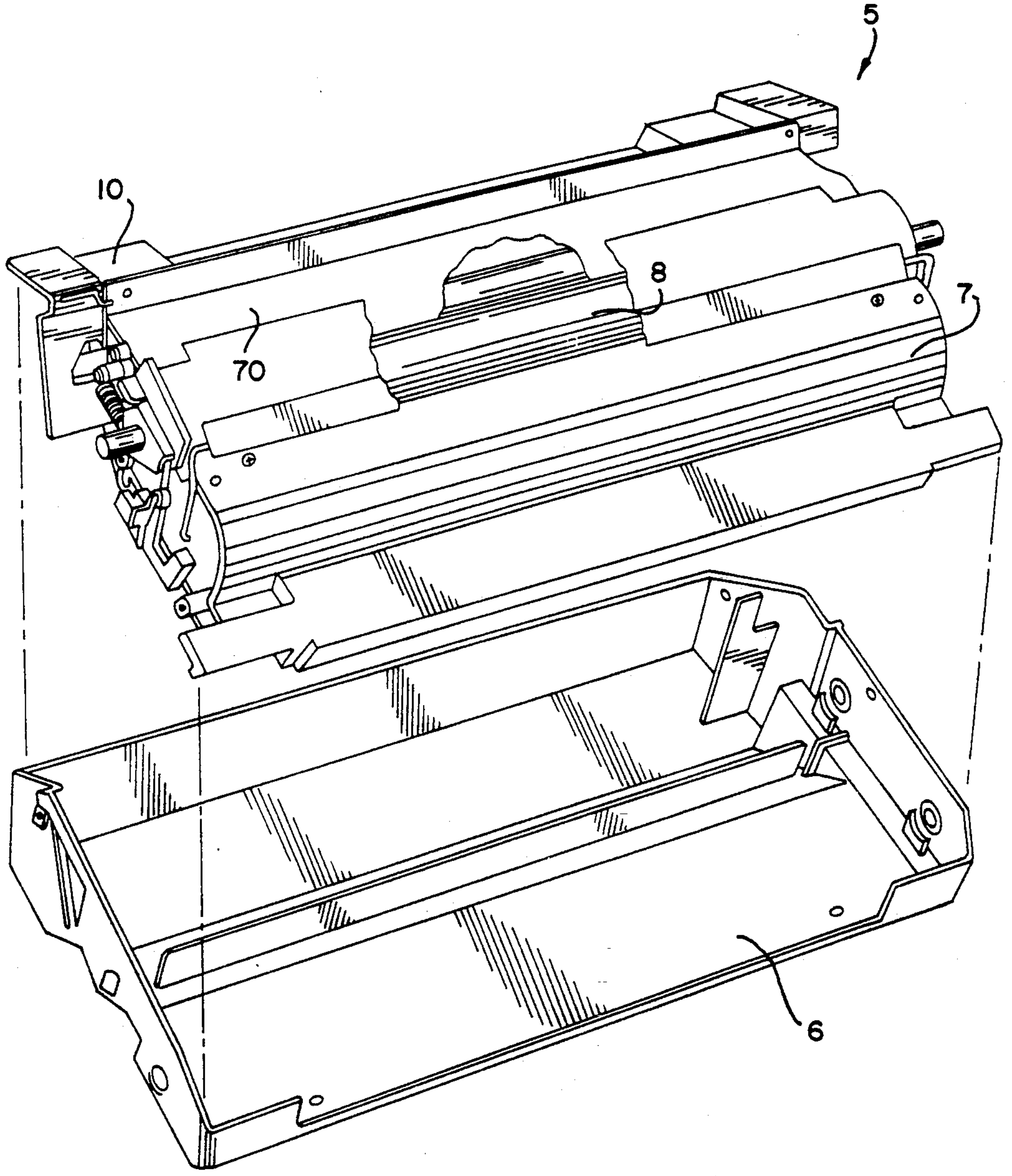
FIG. 1 is a exploded, cut-away view of a toner cartridge.

While the disclosed inventions are susceptible of embodiments in many different forms, there is shown in the drawings and will herein be described in detail, preferred embodiments of the inventions with the understanding that the present disclosure is to be considered as an exemplification of the principles of the inventions and is not intended to limit the broad aspects of the inventions to the embodiment illustrated.

Figure 2:
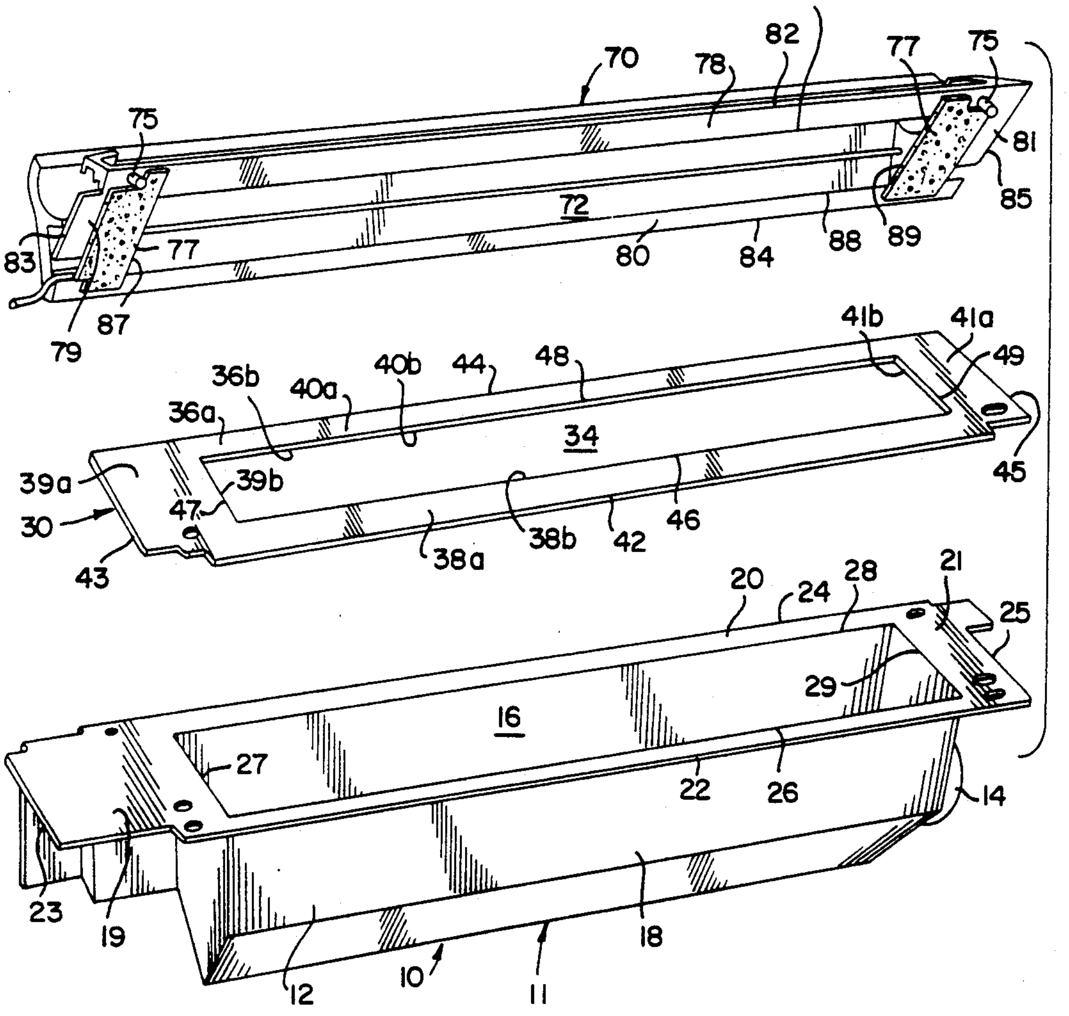
FIG. 2 is an exploded view of a used hopper/mounting member subassembly.

A typical used cartridge 5 is shown in FIG. 1. This cartridge 5 is generally comprised of a shell 6, a waist toner bin 7, a drum assembly 8, a toner hopper 10 and a mounting member 70. The cartridge 5 can be disassembled until only the hopper-mounting member subassembly 11 remains. This subassembly 11 is comprised of hopper 10, mounting member 70, and an additional gasket 30 as shown in FIG. 2. Subassembly 11 is typically ultrasonically welded together as will be discussed later.

Toner hopper 10 has a hollow bin 12, a toner refill opening 14 and a toner discharge opening 16. Discharge opening 16 is defined by peripheral portions 18–21 which are generally flat for receiving the gasket 30. Peripheral portions 18–21 are defined by outer edges 22–25 and inner edges 26–29 respectively.

Gasket 30 has a top surface area 36*a* comprised of surfaces 38*a*–41*a*, and a bottom surface area 36*b* comprised of surfaces 38*b*–41*b*. Top and bottom surface areas 36*a* and 36*b* are defined by outer edges 42–45, and inner edges 46–49. Gasket bottom surface area 36*b* is preferably flat and shaped to engage hopper peripheral portions 18–21. Gasket top surface area 36*a* is also preferably flat and shaped to engage mounting member 70 peripheral portions 78–81. Gasket lengthwise outer edges 42 and 44 are preferably flush with hopper outer edges 22 and 24. Gasket inner edges 46–49 define a gasket opening 34.

Mounting member 70 has peripheral portions 78–81 which define mounting member opening 72. Peripheral portions 78–81 are generally flat and shaped to uniformly engage and attach to gasket top surface area 36*a*. Peripheral portions 78–81 are defined by outer edges 82–85 and inner edges 86–89 respectively.

Prior to installation and use, original subassembly 11 has a removable seal member (not shown) attached to gasket top surface 36*a*. This removable seal member is placed over gasket opening 34 and is removably attached to the inner edges 46–49 of gasket top surface 36*a*. Attached in this way, the removable seal member prevents toner from passing through gasket opening 34 until cartridge 5 is installed and the seal member is removed.

Original subassembly 11 is typically joined together by ultrasonic welds. Hopper 10 is attached to gasket 30 by ultrasonically welding the outer edges 42–45 of gasket surface 36*b* to hopper peripheral portions 18–21. This forms a hopper-gasket seal that prevents toner from leaking between the two members. Mounting member 70 is attached to gasket 30 by ultrasonically welding lengthwise outer edges 78 and 80 of mounting member peripheral portions 78 and 80 to lengthwise outer edges 42 and 44 of gasket surfaces 38*b* and 40*b*. No welds are provided between gasket surfaces 39*b* and 41*b* and mounting member peripheral portions 79 and 81. Instead, seals 77 are attached to mounting member peripheral portions 79 and 81 to prevent toner from leaking after the seal member has been removed. It should be understood that although ultrasonic welds are typically used to join original subassembly 11 together, the following method is applicable where heat welds, glues, adhesives, resins or other similar means of securing are used.

The method of reconditioning and resealing a used cartridge is as follows. Disassemble the used cartridge 5 until only subassembly 11 remains. Removal of the other components facilitates handling during the reconditioning and resealing process and prevents inadvertent damage to the components.

Figure 3:
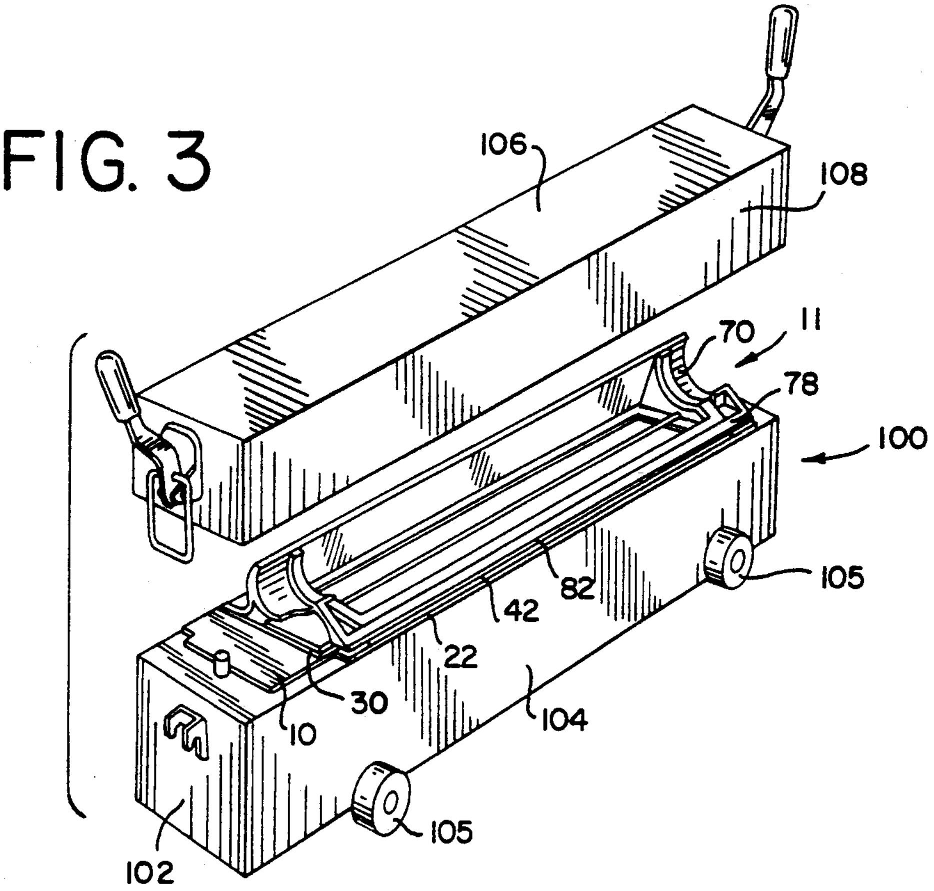
FIG. 3 is a prospective view of a used subassembly being inserted into a cart.

Subassembly 11 is placed in a movable receptacle such as cart 100 as shown in FIG. 3. A bottom portion 102 of cart 100 is provided with walls 104 which are shaped to snugly receive hopper bin 12 and uniformly engage hopper peripheral portions 18–21. Similarly, a top portion 106 of cart 100 is provided with walls 108 which are shaped to snugly receive mounting member 70 and uniformly engage mounting member peripheral portions 78–81. These top 102 and bottom 106 portions are clamped together to fixedly secure subassembly 11 therein. Hopper lengthwise outer edges 22 and 24, gasket lengthwise outer edges 42 and 44, and mounting member lengthwise outer edges 82 and 84 remain exposed.

Figure 5:
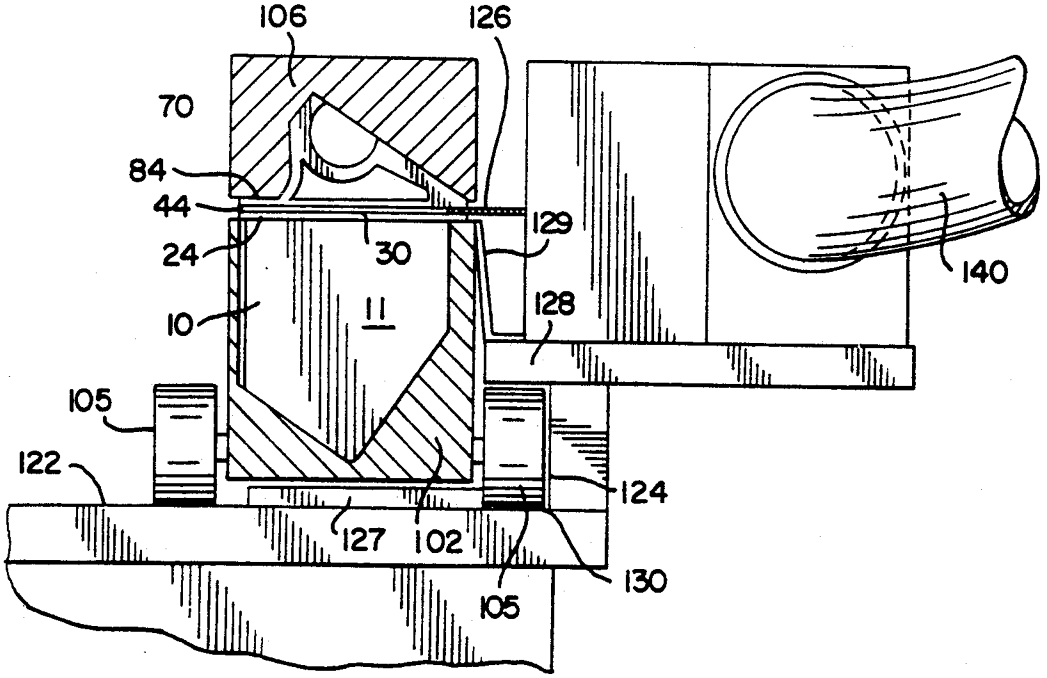
FIG. 5 is a sectional view of a table saw blade cutting away the outer edge of a gasket of a subassembly.
Figure 4:
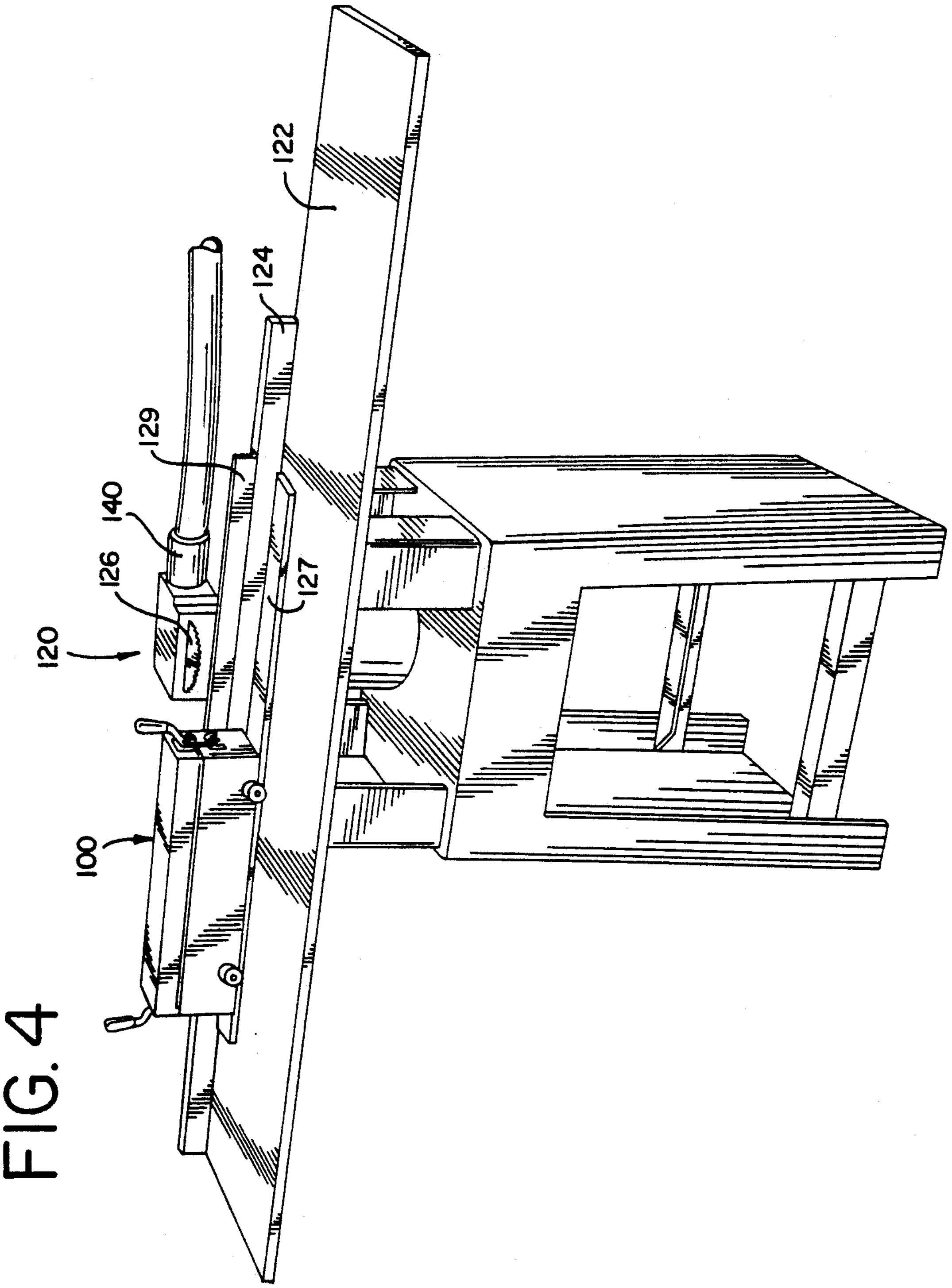
FIG. 4 is a prospective view of a subassembly contained in a cart and placed on the surface of a table saw.

Cart 100 is then placed on a table saw 120, as shown in FIGS. 4 and 5. This table saw is preferably a typical circular saw type table saw. Table saw 120 may be purchased from Grizzley Imports of Bellingham, Washington and modified as discussed below. Table saw 120 has a preferably level surface 122 upon which cart 100 rests, and a side wall 124 from which a blade 126 projects. Cart 100 is sized to align blade 126 directly even with and parallel to gasket surfaces 36*a* and 36*b*. Blade 126 is preferably about 0.023 inches thick, slightly thicker than gasket 30 which is typically 0.020 inches thick. Blade 126 is also set for a cutting depth of about 3/16 of an inch into the gasket outer edge 42. This is the cutting depth needed to cut away the lengthwise hopper-gasket and mounting member-gasket welds that join subassembly 11 components together. Blade 126 cuts away or disintegrates the entire outer 3/16 inch portion of gasket 30. The depth of blade 126 should not be more than 3/16 inch because unnecessary damage to pins 75 or seals 77 could result.

In the preferred embodiment, cart 100 is restricted to one-dimensional movement passed blade 126. Cart 100 is provided with at least one guide member, such as wheels 105 for facilitating smooth, level forward movement of cart 100 over table saw surface 122. A plate 127 is secured to table saw surface 122 a predetermined distance from table saw side wall 124. This provides a track 130 in which wheel 105 will fit and roll. Track 130 is preferably 0.002 to 0.015 wider than wheel 105. This relatively small clearance prevents both the binding of and the lateral movement of wheels 105 as they roll through track 130, thereby ensuring a substantially constant blade depth.

A guide bar 128 projects from table saw side 124 and prevents undesired vertical movement of cart 100. Guide bar 128 is located just high enough above table saw surface 122 to allow wheel 105 to pass under the guide bar. A 0.002 to 0.003 inch clearance between the guide bar 128 and wheel 105 is preferred. This clearance allows wheel 105 to roll freely underneath guide bar 128, but prevents unwanted vertical movement of cart 100. Unrestricted vertical movement would cause blade 126 to move out of alignment with gasket 30. Although cart 100. guide bar 128 and track 130 are preferred for aligning subassembly 11 with blade 126 and moving it across table saw surface 122. it should be understood that other means of alignment and one-directional movement are possible.

Table saw 120 is also provided with a vacuum system 140 for removing waste debris while blade 126 cuts gasket 30. Vacuum system 140 prevents debris from collecting in track 130 and misaligning blade 126 with gasket 30 during cutting. A flexible strip 129, such as a mylar strip, is preferably provided for engage the side of cart 100 so that debris collects in a pocket above guide bar 128. The vacuum system 140 then removes the debris.

The height of table saw blade 126 over table saw surface 122 is preferably adjustable. There are presently several types of cartridges 5, and each cartridge has a differently shaped subassembly 11. Different carts 100 are needed to snugly hold the differently shaped subassemblies 11. Because, it is difficult to manufacture different carts within the tolerances necessary to ensure proper alignment of gasket 30 with table saw blade 126, it is preferred that the height of blade 126 be adjustable.

Cart 100 makes two passes by blade 126—one for each side of the cart. The first pass cuts away or disintegrates gasket outer edge 42. This separates mounting member peripheral portion 78 from gasket surface **38*a*, and hopper peripheral portion 18 from gasket surface 38*b*. The cart is then turned 180 degrees and a second pass is performed. This pass cuts away or disintegrates gasket outer edge 44. This separates mounting member peripheral portion 80 from gasket surface 40*a*, and hopper peripheral portion 20 from gasket surface 40*b*. Mounting member 70 should now be completely separated from gasket 30. If mounting member 70** is not completely separated, it may be manually pried apart by a worker as the majority of the mounting member-gasket bond has been removed.

Figure 6:
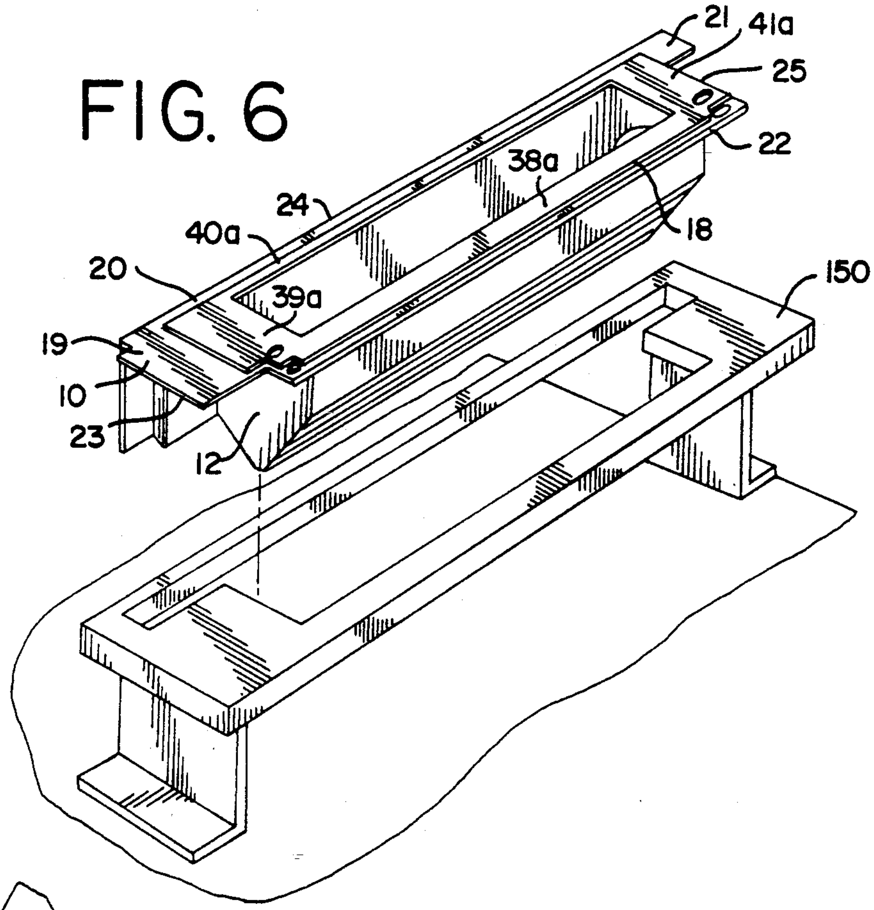
FIG. 6 is an exploded view of a hopper and used gasket placed in a holding container.
Figure 7:
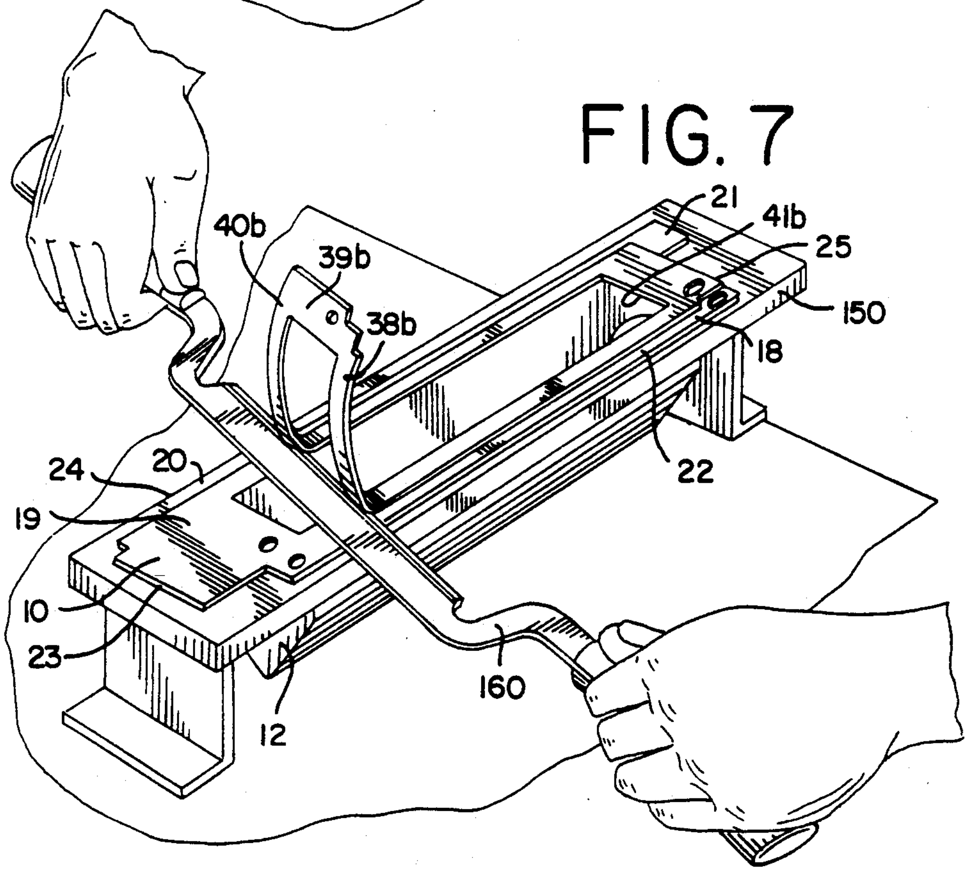
FIG. 7 is a perspective view of an operator using a hand held plane to cut the widthwise hopper-gasket seals.

Hopper 10 is then placed in holding container 150 as shown in FIG. 6. Holding container 150 is shaped to snugly and uniformly engage hopper peripheral portions 18–21. An operator then uses a cutting tool, such as a hand held plane 160, to cut the widthwise hopper-gasket bonds as shown in FIG. 7. The widthwise bonds are located between gasket bottom surfaces **39*b* and 41*b* and hopper peripheral portions 19 and 21** respectively.

Plane 160 can also be used to scrap away any residual material left on hopper peripheral portions 18–21 or mounting member peripheral portions 78 and 80. Residual material could be any remaining glue or fragments of gasket 30. Hopper 10 is preferably left in holding container 140 and mounting member 70 is preferably left in cart top 124 during this scrapping process.

The next step is to clean hopper 10 and mounting member 70 of any toner remaining on their surfaces or in bin 12. The cleaning step is preferably done by vacuuming and/or blowing high pressure air over the surface of hopper 10 and mounting member 70.

Figure 8:
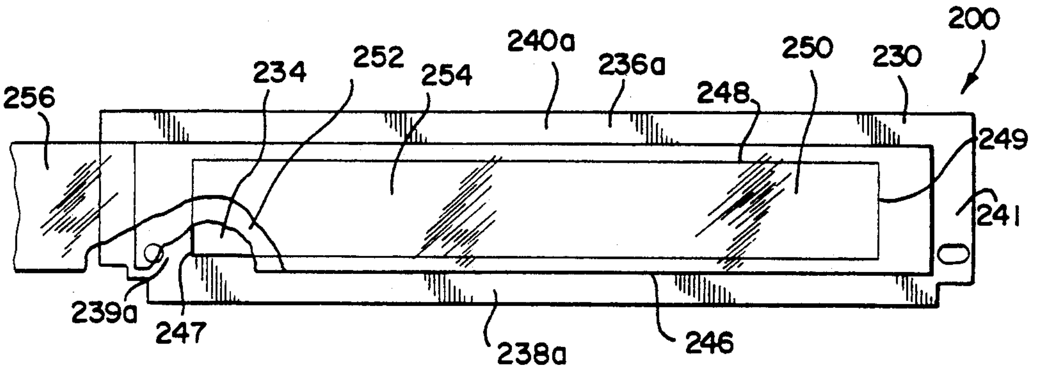
FIG. 8 is a plan view of one embodiment of the seal assembly.
Figure 9:
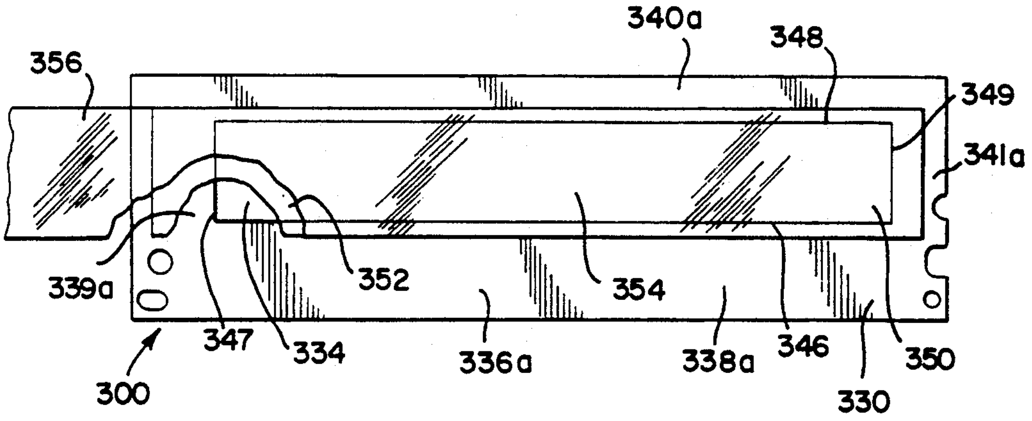
FIG. 9 is a plan view of a second embodiment of the seal assembly.

Subassembly 11 is now reconditioned and ready for resealing. To do this, a new seal assembly 200 or 300 (FIGS. 8 and 9) is secured between hopper 10 and mounting member 70. Seal assemblies 200 and 300 are functionally similar but are shaped differently because each is used in a different type of toner cartridges 5. Because seal assemblies 200 and 300 are functionally the same, the following discussion is directed toward seal assembly 200 only, although the discussion applies to seal assembly 300 as well.

In the preferred embodiment, seal assembly 200 comprises a gasket 230 and a removable seal member 250. Gasket 230 has a top surface area **236*a* comprised of surfaces 238*a*–241*a*, and a bottom surface area 236*b* comprised of surfaces 238*b*–241*b*. Top and bottom surface areas 236*a* and 236*b* are defined by outer edges 242–245, and inner edges 246–249. Bottom surface area 236*b* is preferably flat and shaped to engage hopper peripheral portions 18–21. Top surface area 236*a* is also preferably flat and shaped to engage mounting member peripheral portions 78–81. Lengthwise outer edges 242 and 244 of gasket 230 are preferably flush with hopper outer edges 22 and 24. Gasket inner edges 246–249 may extend beyond hopper inner edges 22–25 and define a gasket opening 234. However, gasket inner edges 246–249 should permit toner to flow across the entire surface of the magnetic roller (not shown) and drum 82**.

Removable seal member 250 is wider than gasket opening 234 but not as wide as gasket 230. Seal member 250 can be divided into first 252 and second 254 portions that together are more than twice the length of gasket opening 234. The first portion 252 is placed over gasket top surface area **236*a* and secured to the inner edges 246–249 of gasket top surfaces 238*a*–241*a*, thereby sealing gasket opening 234. The second portion 254 is slightly longer than first portion 252, and is folded over first portion 252 so that a tab 256 extends beyond gasket outer edge 243. By pulling tab 256, an operator can remove releasable seal member 250 from the gasket 230, thereby allowing toner to flow through gasket opening 234**.

In the preferred embodiment, Gasket 230 is a 0.020 inch thick, high impact polystyrene stamping, and seal member 250 is a 0.005 inch thick laminate film. Both components are manufactured by Transilwrap Company, Inc., Northlake, Ill. 60164. In the preferred embodiment, gasket 230 is a screen grade with no corona treatment and has a white opaque finish. Seal member 250 is a (75/125) clear MR transkote.

A releasable heat activated resin is preferably used to secure seal member 250 to gasket 230. The heat activated resin is preferably applied to the periphery of seal member 250 and can be purchased from Transilwrap already applied. Seal member 250 is then positioned over gasket top surface 236a and placed in a heat platen (not shown) set at about 197 to 227 Degrees Fahrenheit. Seal assembly 200 is left in the heat platen for approximately six seconds at approximately 85 pounds per square inch of pressure. This forms the removable seal between gasket 230 and seal member 250.

Seal assembly 200 is secured to hopper 10 and seals hopper discharge opening 16. For ease of application, a foot operated type glue gun (not shown) is used to apply a first bead of glue 261 around the top surface 36a of hopper peripheral portions 18-21. Care should be taken to apply glue bead 261 along gasket lengthwise outer edges 22 and 24. Gasket bottom surface area 236b is then placed atop this first glue bead 261.

A second 262 and a third 263 bead of glue are applied to lengthwise outer edges 82 and 84 of mounting member peripheral portions 78 and 80 respectively. The lengthwise outer edges 242 and 244 of gasket top surface 236a are then placed over the second and third glue beads. Glue beads 261, 262 and 263 are preferably a styrene based type glue having a holding strength of about 2900 psi at room temperature. This type of glue can be purchased from Eclectic Products, Inc. of Carson, Calif. 90745 under the name E-6000 (clear). However, it should be understood that other types of glues, adhesives or resins may be used.

Figure 10:
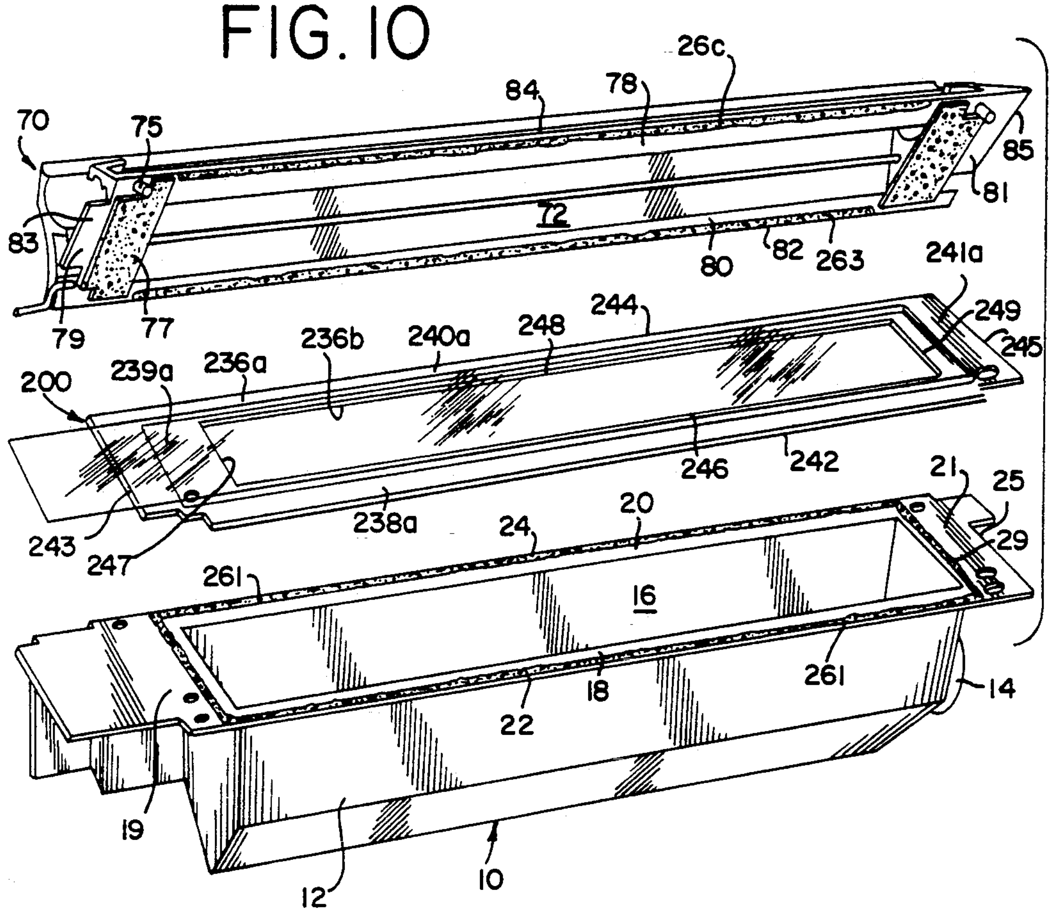
FIG. 10 is an exploded view of the hopper, new seal assembly and mounting member with beads of glue applied to the appropriate surfaces of the hopper and mounting member.
Figure 11:
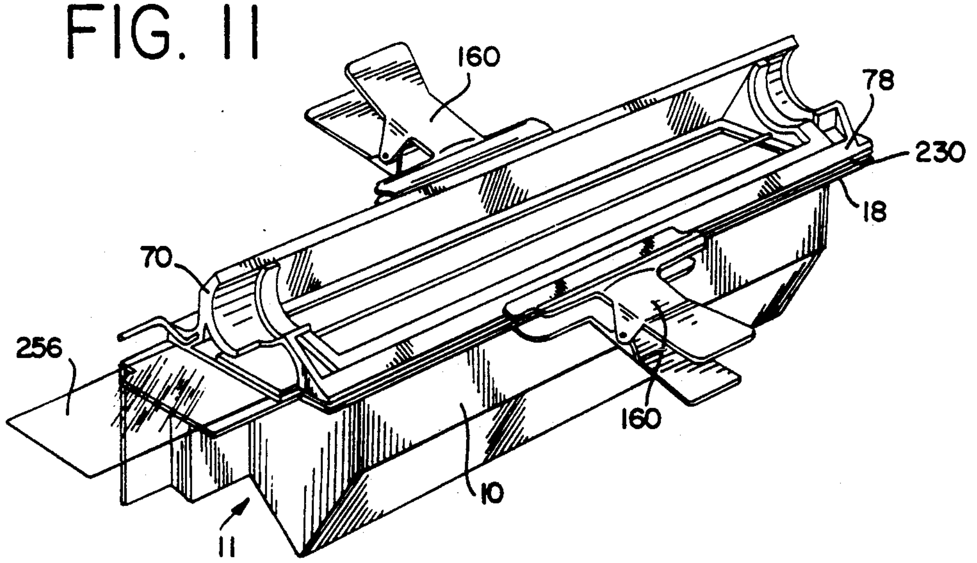
FIG. 11 is a prospective view of the hopper, new seal assembly and mounting member clamped together.

Finally, clamps 160 are used to clamp hopper peripheral portions 18 and 20 and mounting member peripheral portions 78 and 80 together as shown in FIG. 10. Clamps 160 are left in place until all three glue beads 261, 262 and 263 are substantially dry.

Subassembly 11 is now reconditioned and resealed, and can be reconnected to the other components of cartridge 5 and refilled with toner. Seal assembly 200 forms a reliable seal over hopper discharge opening 16 so that toner will not leak out of hopper bin 12 during shipping and handling.

It will be understood that the inventions may be embodied in other specific forms without departing from the spirit or central characteristics thereof. The present examples and embodiments, therefore, are to be considered in all respects as illustrative and not restrictive, and the inventions are not to be limited to the details given herein.

I claim:

1. A method of reconditioning and resealing a toner cartridge, said method comprising the steps of:

providing a toner cartridge having a toner cartridge subassembly, said subassembly having a toner hopper with a toner discharge opening, a used gasket, and a mounting member, said toner hopper and said mounting member being attached to said used gasket;

separating said toner hopper and said mounting member from said used gasket; and, securing a new seal assembly to said toner hopper and mounting member, said new seal assembly covering said hopper discharge opening.

2. The method of claim 1, wherein said new seal assembly is comprised of a new removable seal member and a new gasket having a gasket opening, said new removable seal member being attached to said new gasket and covering said gasket opening.

3. The method of claim 1, wherein said mounting member is separated from said used gasket by cutting away said used gasket.

4. The method of claim 1, wherein said used gasket has a top surface and an outer edge, said mounting member being attached to said outer edge of said top surface of said used gasket, and wherein said mounting member is separated from said used gasket by cutting away said outer edge of said used gasket.

5. The method of claim 1, wherein said used gasket has a bottom surface, a lengthwise outer edge, and a widthwise portion, said toner hopper being attached to said lengthwise outer edges and said widthwise portion of said bottom surface of said used gasket, wherein said lengthwise outer edge of said toner hopper is separated from said used gasket by cutting away said lengthwise outer edge of said used gasket, and wherein said widthwise portion of said used gasket is cut from said toner hopper.

6. The method of claim 2, wherein said toner hopper has a peripheral portion, and said new gasket has a gasket opening and top and bottom surfaces, and wherein said bottom surface of said new gasket is secured to said peripheral portion of said toner hopper, and said new removable seal member is secured to said top surface of said new gasket and covers said gasket opening.

7. The method of claim 1, further comprising the step of scraping residual material from said toner hopper an mounting member before securing said new seal assembly to said toner hopper and mounting member.

8. The method of claim 1, further comprising the step of cleaning said toner hopper and mounting member before securing said new seal assembly to said toner hopper and mounting member.

9. The method of claim 1, further comprising the steps of:

disassembling said toner cartridge subassembly from said toner cartridge prior to separating said toner hopper and mounting member from said used gasket, and reassembling said subassembly to said toner cartridge after said new seal assembly has been secured to said toner hopper and mounting member.

10. The method of claim 4, wherein a table saw blade is used to cut away said outer edge of said used gasket.

11. The method of claim 10, wherein said table saw blade has a blade depth of about 3/16 inch.

12. The method of claim 5, wherein a table saw is used to cut away said lengthwise outer edge of said used gasket and a plane is used to cut said widthwise portion of said used gasket from said mounting member.

13. The method of claim 12, wherein said table saw blade has a blade depth of about 3/16 inch.

14. The method of claim 13, wherein glue is used to secure said new gasket to said hopper and said mounting member.

15. The method of claim 2, wherein a heat activated resin is used to attach said new removable seal member to said new gasket.

16. A method of reconditioning and resealing a toner cartridge, said method comprising the steps of:

providing a toner cartridge having a toner cartridge subassembly, said subassembly having a toner hopper with a toner discharge opening, a used gasket, and a mounting member, said used gasket having a top surface, a bottom surface, a lengthwise outer edge and a widthwise portion, said mounting member being attached to said lengthwise outer edge of said top surface of said used gasket, and said toner hopper being attached to said lengthwise outer edge and said widthwise portion of said bottom surface of said used gasket, disassembling said toner cartridge subassembly from said toner cartridge;

cutting away said lengthwise outer edge of said used gasket to separate said mounting member from said used gasket;

cutting said widthwise portion of said used gasket to separate said toner hopper from said used gasket;

scraping residual material from said toner hopper and mounting member;

cleaning said toner hopper and mounting member;

gluing a new seal assembly between said toner hopper and mounting member, said new seal assembly comprising a new removable seal member and a new gasket having a gasket opening, said new removable seal member being attached to said new gasket and covering said gasket opening, and said new seal assembly covering said hopper discharge opening; and, reassembling said subassembly to said toner cartridge.

17. The method of claim 16, wherein a table saw blade is used to cut away said lengthwise outer edge of said used gasket.

18. The method of claim 16, wherein said table saw blade has a blade depth of about 3/16 inch.

19. The method of claim 16, wherein a plane is used to cut said widthwise portion of said used gasket from said mounting member.

20. The method of claim 16, wherein a heat activated resin is used to attach said new removable seal member to said new gasket.

* * * * *

UNITED STATES PATENT AND TRADEMARK OFFICE
CERTIFICATE OF CORRECTION

PATENT NO. : 5,223,068

DATED : June 29, 1993

INVENTOR(S) : Raymond Baley

It is certified that error appears in the above-identified patent and that said Letters Patent is hereby corrected as shown below:

In Column 1, line 39, replace "." by ",".

Claim 1, line 54, after "being" insert the word "rigidly".

Claim 7, line 28, replace "an" by "and".

In Column 2, line 67, after "is" replace "a" by "an".

In Column 3, line 3, after the first "a" replace "prospective" by "perspective".

In Column 3, line 4, after the first "a" replace "prospective" by "perspective".

In Column 3, line 22, after "a" replace "prospective" by "perspective".

In Column 5, line 36, after "for" replace "engage" by "engaging".

In Column 5, line 45, after "Because" delete ",".

In Column 6, line 4, after "to" replace "scrap" by "scrape".

In Column 6, line 10, after "this" replace "scrapping" by "scraping".

In Column 6, line 21, after "toner" replace "cartridges" by "cartridge".

Column 7, line 2, after "heat" replace "platen" by "plate".

In Column 7, line 4, after "heat" replace "platen" by "plate".

UNITED STATES PATENT AND TRADEMARK OFFICE

CERTIFICATE OF CORRECTION

PATENT NO. : 5,223,068

DATED : June 29, 1993

INVENTOR(S) : Raymond Baley

It is certified that error appears in the above-indentified patent and that said Letters Patent is hereby corrected as shown below:

Column 8, line 4, claim 16, replace "," by ";".

Signed and Sealed this

Tenth Day of May, 1994

Attest:

BRUCE LEHMAN

*Attesting Officer*

*Commissioner of Patents and Trademarks*